United States Patent
Constant

[11] 3,988,572
[45] Oct. 26, 1976

[54] SYNTHETIC APERTURE SYSTEM FOR INFORMATION TRANSFER AND OBJECT IDENTIFICATION

[76] Inventor: James Nickolas Constant, 1603 Danbury Drive, Claremont, Calif. 91711

[22] Filed: Mar. 27, 1975

[21] Appl. No.: 562,637

Related U.S. Application Data

[63] Continuation-in-part of Ser. No. 445,358, Feb. 25, 1974, which is a continuation-in-part of Ser. No. 321,646, Jan. 8, 1973, abandoned, which is a continuation-in-part of Ser. No. 209,048, Dec. 17, 1971, abandoned.

[52] U.S. Cl. .......................... 235/61.11 E; 250/570; 350/3.5
[51] Int. Cl.² .................. G06K 7/10; G02B 27/38
[58] Field of Search ..................... 350/3.5, 162 SF; 250/216, 566, 568, 570; 235/61.11 E, 61.7 B; 340/146.3 Z; 356/113

[56] References Cited
UNITED STATES PATENTS

3,617,754  11/1971  Hildebrand ........................ 350/3.5
3,655,258  4/1972  Hildebrand ........................ 350/3.5

OTHER PUBLICATIONS

Bertolotti et al., Applied Optics, vol. 7, No. 10, Oct. 1968, pp. 1961–1964.
Porcello et al., IEEE Spectrum, Sept. 1969, pp. 52–62.
Goodman, Introduction to Fourier Optics, June 1968, pp. 184–196 and pp. 205–208.

Primary Examiner—Daryl W. Cook
Assistant Examiner—Robert M. Kilgore
Attorney, Agent, or Firm—Harris, Kern, Wallen & Tinsley

[57] ABSTRACT

A system for information transfer and object identification. A record or label having resolution elements forming an image or code, and a coherent optical system including light source, detector, and data processor for reading records and labels moving relative to the optical system. The optical system output is a pulse train of time compressed pulses with pulses corresponding to the resolution elements of a record or label illuminated by the light source, the plurality of pulses forming the image or code.

4 Claims, 3 Drawing Figures

SYNTHETIC APERTURE SYSTEM FOR INFORMATION TRANSFER AND OBJECT IDENTIFICATION

This application is a continuation-in-part of my copending application Ser. No. 445,358, filed Feb. 25, 1974, Synthetic Aperture System for Information Transfer and Object Identification, which was a continuation-in-part of my copending application Ser. No. 321,646, filed Jan. 8, 1973, Instanteous Information Reading System for Information Transfer and Object Identification, now abandoned, which was a continuation-in-part of my copending application Ser. No. 209,048, filed Dec. 17, 1971, Synthetic Information Systems, now abandoned, and is related to my U.S. Pat. No. 3,691,557, System for Identifying Objects Using an Encoding Array for Each Object.

BACKGROUND OF THE INVENTION

The present invention relates to coherent information transfer and object identification systems and more particularly to an optical system and method which utilizes the synthetic aperture technique well known in the microwave art.

Several attempts have been made at object identification using coherent optics. For example, U.S. Pat. Nos. 3,532,426 and 3,597,045 disclose holographic correlation systems using inscribed codes for modulating coherent light beams. Although these attempts have been successful, they require a large number of optical matched filters prior to the actual detection of correlated signals and consequently their filters cannot be quickly accessed. By way of contrast, the present invention first detects signals and then implements the simpler and more economical electrical matched filters which can be simultaneously accessed.

The present invention provides apparatus and method for applying certain teachings of the synthetic aperture art, namely the detection of chirp signals of objects moving through the beam of an aperture, in combination with real time electronic processing of chirp signals, to the rapid reading of records and labels and to object identification. There is no known optical apparatus for using a coherent source for reading records or labels in real time. For example, the article by Barker "21 Ways to Pick Data Off Moving Objects" appearing in the October 1963 issue of Control Engineering and the article by Whittaker and Sexton "Printers and Readers Handshake for Effective Bar Code Systems" appearing in the September 1974 issue of Computer Design nowhere suggest apparatus or method for using a coherent source, much less for using a coherent source in a synthetic aperture as taught by the system of the present invention. U.S. Pat. Nos. 3,532,426 and 3,597,045 while attempting object identification using a coherent source, use the two step and time consuming reconstruction procedure of the known hologram art. Thus while coded labels are well known in the optical identification art, they can be read only in real time using non-coherent sources, or, alternatively, when more resolution of coded elements is needed, they can be read only in a two step coherent but time consuming process using the teachings of the hologram art. The system of the present invention teaches that coded records and labels can be read rapidly in real time by first detecting chirp signals and processing these signals electrically in a matched filter following their detection. The prior identification art using coherent sources reconstructs the recorded image in the two step and time consuming procedure of conventional holography and therefore while having the potential, falls short of providing apparatus and method for the rapid reading of records and labels.

Coherent optical information transfer and object identification systems are needed in the transportation, mail, stock, container, carton, packaging, etc., industries for quickly identifying objects, for example as point-of-sale identifiers in the retail industry. Presently known optical identifiers operate non-coherently by scanning bar code type labels to obtain the information. As a consequence, they are limited in their resolutions by the wavelength $\lambda$, the inverse aperture size D, and range R to the object. By way of contrast, the present invention offers a resolving capability which is limited only by the aperture size D.

SUMMARY OF THE INVENTION

The present invention provides means and method for coherent optical information transfer and object identification. Monochromatic spatially coherent light is directed onto a record, which may be in the form of microfilm, tape, encoded label, or like surface record, or even a volume or bulk record such as a signal propagating in an ultrasonic medium, and which is examined while in transit of a coherent light beam in a manner which is quite analogous to the generation of a synthetic aperture at microwave frequencies. The energy scattered from the record falls onto a detector which also receives a reference energy beam. The resulting detected signal may be electronically processed to produce the image or code for the record.

The general object of this invention is to provide a coherent optical information transfer system which operates in real time. A particular object of the invention is to provide a coherent optical identification system for coded or labeled objects.

DESCRIPTION OF THE PREFERRED EMBODIMENTS

Figure 1:
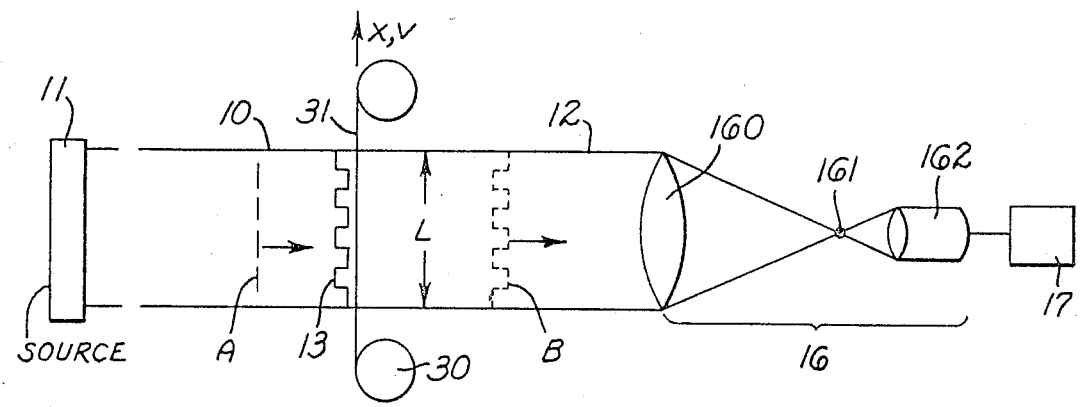
FIG. 1 is a diagram of a transmitting system incorporating a preferred embodiment of the invention.

In the information transfer system of FIG. 1, a monochromatic spatially coherent light in the form of a collimated light beam 10 from a source 11 is directed onto a record or label 13. The illuminated record can be viewed and recorded in a viewing and recording system 16 using well known synthetic aperture techniques. In the system of the present invention, signals from record 13 are detected in detector 162 and then subsequently time compressed in data processor 17. The beam 10 is a monochromatic beam of light. In its simplest form viewing and recording system 16 comprises a photodetector 162. As shown in FIG. 1, viewing and recording system 16 may include a lens 160 for focussing the resulting beam 12 onto a focal point 161 which can be viewed by a photodetector 162. Resulting beam 12 consists of the coded wavefront B which represents the modulation or information of record 13 and results from the interaction of wavefront A and record 13 and a reference wavefront which is the undisturbed wavefront A. While not shown in the figure it should be understood that reference wavefront A may equally well be obtained using a separate reference spatial channel in the manner of conventional holography.

The system of the present invention is based on the generation of a synthetic aperture at optical frequencies. Basically, the reference A and coded B wavefronts fall on a photodetector 162 (with or without lens 160) which detects the motion of individual resolution elements 51 in record 13, passing through beam 10 in the direction x with speed v, as chirp signals with a chirp signal for each resolution element 51. The procedure has been described by Lewis and Hutchins "Synthetic Aperture at Optical Frequencies" appearing in the April 1970 issue of Proc IEEE (Lett) and in the article by Bertolotti et al "On a Method of Conversion and Reconversion of Spatial into Temporal Frequencies" appearing in the October 1968 issue of Applied Optics, both of which should therefore be incorporated by reference to the present specification. Thus while my U.S. Pat. No. 3,691,557 discloses an identification system using a synthetic aperture at microwave frequencies, the present invention discloses an identification system using a synthetic aperture at optical frequencies.

Briefly, my U.S. Pat. No. 3,691,557 discloses a transmitter for illuminating a label and for providing a reference signal to a receiver which also receives a signal reflected from the label. The receiver detects the signal from an element in the label and the reference and provides a chirp signal at its output for each element moving through the transmitter beam, with the chirp signal representing the time function of the detected beat between the element and reference signals. The chirp signal is inputted to a data processor which provides as an output, a time compressed pulse for each chirp signal appearing at its input. Each time compressed pulse appearing at the output of the data processor represents an element of the label, with a plurality of time compressed pulses representing the image and code of the label. Thus, the system of my U.S. Pat. No. 3,691,557 discloses an identification system at microwave frequencies which is similar in all respects excepting its frequency of operation to the optical identification system of the present invention. Both systems are based on the well known radar technique of synthetic aperture. That a beat or Doppler signal representing the beat between a signal reflected by a target, for example an element of a label, crossing an electromagnetic beam and a reference signal can be used to produce a chirp signal in time are well known consequences of the synthetic aperture technique and has been demonstrated by Lewis and Hutchins. That a chirp signal can be inputted to a data processor, for example a matched filter, and compressed into a pulse is a well known task in signal processing, for example in the later references of Skolnik and Squire. Finally, that the sequence of output pulses from the data processor forms an image or code of the label is a direct consequence of the one-to-one correspondence between a time compressed pulse at the output of the data processor and an element in the label. The foregoing are well known techniques of the related radar and signal processing arts; all that is needed is an optical source and detector to implement the system of the present invention and these are available in a variety of types.

More particularly, photodetector 162 produces the beat signal of the coded B and reference A waveforms contained in beam 12. The beat signal is the Doppler frequency resulting from the motion of a resolution element 51 through beam 10. The detected beat signal when viewed over a period of time is in the form of a chirp signal for each element 51 of record 13 and can be subsequently processed in an electrical matched filter forming part of data processor 17 to produce a time compressed pulse for each element 51 crossing beam 10 and with the plurality of time compressed pulses at the output of data processor 17 forming the image or code of record 13. Unlike the prior art wherein a matched optical filter is inserted in the Fourier plane of lens 160 and a second lens is used to image record 13 and wherein a plurality of matched optical filters are needed to detect a plurality of records 13, the system of the present invention first detects a plurality of overlapping chirp signals (corresponding to elements 51 in a record 13) in a photodetector 162 and implements an electrical matched filter in data processor 17 to read the code of record 13.

The detection of the combination of coded B and reference A wavefronts by the photodetector produces at its output the beat or doppler frequency of elements 51 present in record 13 and forming its code and, if viewed over a period of time as elements 51 cross through beam 10, will result in a plurality of overlapping chirp signals of the type shown by Lewis and Hutchins and by Bertolotti. Thus succeeding elements 51 will produce succeeding chirp signals at the output of photodetector 162. The chirp signals are inputted to a data processor 17 which may be in the form of an electrical matched filter, and time compressed into short pulses with a time compressed pulse appearing at the output of data processor 17 for each element 51 crossing beam 10. In this manner, succeeding elements 51 crossing beam 10 will produce succeeding time compressed pulses at the output of data processor 17, with the plurality of time compressed pulses forming the image or code of record 13.

The normal procedure in a synthetic aperture is to record a zone plate (one dimensional hologram) and then reproduce the image holographically. This is a two step procedure and is time consuming. It cannot therefore be used for the rapid, automatic reading of records and labels and the real time reconstruction of images or identification of objects with labels. The normal procedure in a synthetic aperture is therefore not a preferred procedure in the system of the present invention, which eliminates the time consuming reconstruction of images by first detecting and then processing the information in real time. Photodetector 162 provides a chirp signal for each element 51 in record 13. The chirp signal is compressed to a short pulse in data processor 17. Thus while normally a synthetic aperture uses the familiar two step procedure of holography to record and reproduce the image of an object, the preferred system of the present invention first detects the information (normally used to record a zone plate) and then electrically processes the information to obtain the image in data processor 17.

A conveyor system may be used to hold and transport coded record 13 with elements 51 in the direction x at speed v. More particularly, the conveyor system may be in the form of a rotating film reel 30 for holding and moving film or tape 31 through beam 10 as shown in FIG. 1. Planar wavefront A impinges upon the transmitting record 13 and emerges as a coded wavefront B and, in addition, uncoded or reference wavefront A. The combination of wavefronts A and B are detected by photodetector 162. Although not essential to the system operation, a lens 160 or more sophisticated optics may be utilized to form the aperture of photodetector 162. A single element 51 in record 13 crossing beam 10 in direction $x$ and with speed v will produce a chirp signal at the output of photodetector 162 as shown by Lewis and Hutchins, Bertolotti, and as more fully explained and illustrated in my U.S. Pat. No. 3,691,557. The chirp signal from photodetector 162 can be subsequently processed in data processor 17 to produce a single time compressed pulse appearing for each element of record 13 crossing beam 10. The image or code of record 13 is obtained by viewing or recording the plurality of time compressed pulses appearing at the output of data processor 17. The output pulses may be viewed directly on an oscilloscope or a recorder, may be transmitted to a remote location for further use and may be stored in a memory, as desired.

The system of the present invention operates equally well with laser 11 operating as a continuous wave (CW) or as a pulsed laser. In the CW case, photodetector 162 detects a continuous chirp signal for each element 51 while in the pulsed case photodetector 162 detects a sampled chirp signal with samples corresponding to the pulse rate of laser 11. In either case, as a CW or sampled chirp, the detected signal is inputted to data processor 17 and is time compressed to produce a much shorter pulse at its output compared to the chirp signal pulse at its input, a standard task; all that is necessary is to implement data processor 17 as an electrical matched filter to the signal appearing at its input.

Reference may be had to the following publications for details of the components of synthetic aperture systems for fequency modulated waveforms (chirps) of the type produced by photodetector 162:

L. J. Cutrona et al "On the Application of Coherent Optical Processing Techniques to Synthetic Aperture Radar" Proc IEEE Vol. 54 No. 8 August 1966;

W. M. Brown and L. J. Procello "An Introduction to Synthetic Aperture Radar " IEEE Spectrum 1969;

R. O. Harger "Synthetic Aperture Radar Systems Theory and Design" Academic Press;

M. I. Skolnik "Introduction to Radar Systems" pp. 493–498 McGraw-Hill 1962;

W. D. Squire et al "Linear Signal Processing and Ultrasonic Transversal Filters" IEEE Trans on Microwave "Theory and Techniques" Vol. MIT-17 No. 11, November, 1969.

In particular, the foregoing references may be used to implement data processor 17 having a chirp signal input as provided by photodetector 162 and representing information by an element 51 of record 13 and for providing at its output a time compressed pulse for each chirp signal received by its input. For example, see Skolnik at page 494 and Squire for the implementation of time compressors and pulse compression filters. Since elements 51 in record 13 pass through beam 10 in time sequence, the chirp signals detected by photodetector 162 and appearing as inputs to data processor 17 and corresponding time compressed pulse outputs of data processor 17 likewise appear in time sequence, thus forming the image of record 13. The method has more fully been explained using microwaves in my U.S. Pat. No. 3,691,557.

Although the system of the present invention has been disclosed in terms of one dimensional movement, along the direction $x$, it should be understood in FIG. 1 that elements 51 (targets) are not necessarily confined to the plane of the figure but may be offset therefrom, in the direction $y$ normal to the plane of the figure. As suggested by Bertolotti, all that is needed is to have a relative motion in the direction $y$ as well as in direction $x$. Yet it is a standard task to obtain useful information of elements 51 crossing beam 10 in the direction $x$ without having relative motion in the direction $y$. For example, Bertolotti's slit $S_2$ while specified to be placed along a diameter of the interference pattern in the direction of relative motion can clearly be offset in a direction normal to the motion. In another example, my U.S. Pat. No. 3,790,939 provides a method for obtaining useful chirp signals from targets offset from the direction of motion.

Figure 2:
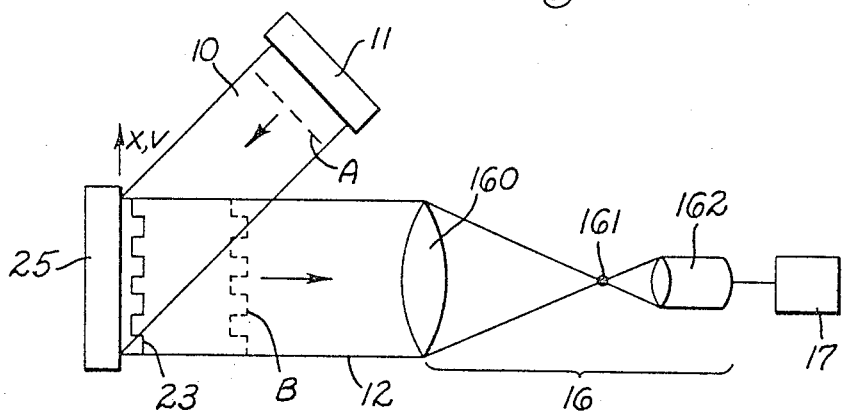
FIG. 2 is a diagram of another embodiment of the invention using a reflective label to perform the functions of a record.

It should be understood that although light beam 10 has been illustrated as a collimated light beam, it need not be so restricted and may assume whichever geometrical shape may be required by the application. Furthermore, the direction of illumination of light beam 10 need not be coincident with the line between record 13 and photodetector 162. The term "on-line" will be used to indicate wavefronts A and B falling on aperture D (of photodetector 162 or lens 160) of viewing and recording system 16 from the same direction while the term "off-line" will be used to indicate wavefronts A and B falling on aperture D from different directions. Technically, the off-line implementation is achieved using optical means for splitting wavefront A into two paths in the well known apparatus and method of conventional holography. Finally, it should be understood that the record 13 and label 23 may be either of the transmitting or reflective type. The term "transmission record" will be used to indicate wavefront A when directed to record 13 emerges in beam 12, as suggested in FIG. 1, while the term "reflective record" will be used to indicate wavefront A when directed to label 23 emerges in beam 12, as suggested in FIG. 2.

In general it should be understood that the operation and components of the system of the present invention comprise a coherent optical synthetic aperture system which follows closely the coherent microwave synthetic aperture system disclosed in my U.S. Pat. No. 3,691,557 which therefore should be incorporated by reference to the present specification.

In particular it should be understood that the conventional resolution s, i.e., the smallest resolution of elements 51 of record 13 or of label 23 which can be obtained without synthetic aperture is given by $$s = \lambda R/D \qquad (1)$$

where
 s = resolution
 λ = wavelength
 D = aperture size, for example size of a lens 160 or in the absence of lens 160, size of a photodetector 162.
 R = distance between record 13 or label 23 and lens 160 or in the absence of lens 160, photodetector 162,
and that when using the synthetic aperture system of the present invention, the resolution is $$s = D \qquad (2)$$

wherein significantly the resolution s is independent of the parameters of wavelength λ, and range R, being proportional to the aperture size D. This can all be seen explained more fully in my U.S. Pat. No. 3,691,557 and is a well known result for synthetic aperture systems.

Typically a plurality of records 13 may be rapidly read in a sequence, each record having a different information content (number and location of elements 51) and each occupying beam 10 in sequence, for example when reading a film 31 passing through beam 10. Similarly, a plurality of labels 23 may be read, with a label 23 for each object 25 and with labels 23 occupying beam 10 in sequence, for example when reading labels attached to objects 25 passing through beam 10.

Figure 3:
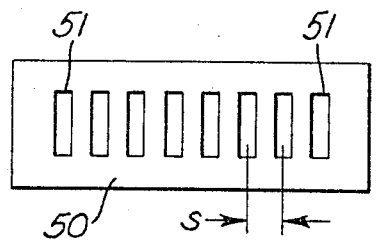
FIG. 3 is a plan view of a mask which may be used to make records and labels.

Record 13 may be in the form of a point record such as a molecule, single letter, single character, single item, etc., or in the form of a surface record such as a picture, written material, microfilm, tape, thin film memory, etc., or in the form of a volume record such as a molecular lattice, plasma, mass flow, bulk memory, etc. For example, a coded record may be constructed by depositing quartz onto a substrate through mask 50, as illustrated in FIG. 3. This deposition creates a coded relief of varying optical thickness which changes the phase of light travelling through the record so that a phase modulated wavefront, i.e., coded wavefront B, emerges from the record. A coded record may also comprise a precoded film or tape 31. A variety of labels are possible, for example those shown by Whittaker and Sexton. An example of a volume or bulk record 13 may be obtained by using an ultrasonic delay cell modulator for modulating light beam 10, for example as indicated in U.S. Pat. No. 3,483,386.

In like manner, the label 23 may be in the form of a point, surface or volume record, although the surface record lends itself to the most convenient use in a practical identification system using labels, for example labels as shown by Whittaker and Sexton. A coded label may also be constructed by depositing aluminum or some other reflective or retro-reflective material onto a substrate through the mask 50. This deposition creates a coded relief of varying height or reflectivity which causes a ray of light to travel a different distance or to become absorbed or reflected so that the phase modulated wavefront, i.e., coded wavefront B, is reflected from the label.

When using mask 50, the spacing s between elements, bars, or slots 51 is chosen to provide adequate resolution as given by equation (2). The coding may be assigned, for example, by the presence or absence of individual slots 51. Although shown as a series of equally spaced slots 51 of equal height, it should be understood that the construction of record 13 and label 23 need not be limited to this specific configuration. Thus the record or label may be any one of any number of types subject only to the constraints imposed in its use in conjunction with the present application. As example, optical labels which may be utilized are discussed in the article by Whittaker and Sexton. The words "label" and "record" are intended to be used interchangably in the specification and claims.

In operation, source 11 illuminates the record 13 or label 23. The resulting beam 12 comprising uncoded wavefront A and coded wavefront B is received by photodetector 162 through lens 160. It should be understood that while lens 160 is shown as part of viewing and recording system 16, its use is not basic to the system operation; the simplest form of viewing and recording system 16 is a photodetector. A lens or lens system 160, whether as a simple lens or any one of a number of optical systems, may be inserted between record 13 and photodetector 162 for the purpose of implementing off-line system operation, increasing, focussing, or optimizing the system range, resolution, field of view, and so forth. Photodetector 162 detects the beat signal of wavefronts A and B contained in beam 12. The beat signal for each element 51 is in the form of a chirp signal and is fed to the data processor which provides at its output a time compressed pulse. Thus a plurality of elements 51 in a record 13 or label 23 passing through beam 10 will produce a plurality of time compressed pulses at the output of the data processor 17. The plurality of time compressed pulses forms the image or code of record 13 or label 23.

Although a particular information transfer and identification system has been described, it should be understood that the scope of the invention should not be considered to be limited by way of illustration, but rather by the appendant claims.

I claim:
1. In a system for information transfer and object identification, the combination of:
   a plurality of labels with a label for each object to be identified, with each label having resolution elements forming a code for identifying the object;
   means for moving said labels through a zone; and
   a coherent optical system including a source, a detector, and a data processor,
   said source including means for directing light output to said zone where a label moves relative to said source and detector, with the resolution elements of a label at said zone illuminated by said source for providing signals from said elements to said detector, said source further including means for directing light output to said detector for providing a reference signal from said source to said detector,
   said detector including aperture means for receiving signals from said illuminated resolution elements and reference signal at the detector input and providing chirp signals at the detector output for each resolution element illuminated, with said chirp signal representing the detected beat signal of a signal from an illuminated resolution element and said reference signal, and
   said data processor having the detector output chirp signals as an input and providing as an output a time compressed pulse for each chirp signal appearing at its input,
   with each said time compressed pulse representing a resolution element of a label illuminated by said source, and with a plurality of time compressed pulses output from said data processor representing the image and code of said illuminated label.

2. A system as defined in claim 1 wherein the smallest spacing of said elements in a label at a particular wavelength and range of operation is substantially equal to the size of aperture along the path of relative motion of said label and detector.

3. A system as defined in claim 1 wherein the smallest spacing of said elements in a label is substantially a linear dependence of the size of aperture along the path of relative motion of said label and detector and is substantially independent of the wavelength of operation of said source and the distance between said label and detector.

4. A method of reading a record, including the steps of:
- encoding the record;
- illuminating the record by a coherent source and receiving an echo illumination from the record;
- moving the record through the beam of the source;
- obtaining a reference illumination from the source;
- detecting the combined echo and reference illuminations as a plurality of chirp signals representing the elements of the record; and
- time compressing the detected chirp signals to obtain the information image and code of the record.

* * * * *